(12) United States Patent
Choi et al.

(10) Patent No.: US 10,141,881 B2
(45) Date of Patent: Nov. 27, 2018

(54) APPARATUS FOR CONTROLLING INVERTER (71) Applicant: LSIS CO., LTD., Gyeonggi-do (KR)

(72) Inventors: Seung-Cheol Choi, Gyeonggi-do (KR); Hak-Jun Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/641,758

(22) Filed: Jul. 5, 2017

(65) Prior Publication Data
US 2018/0226912 A1 Aug. 9, 2018

(30) Foreign Application Priority Data

Feb. 3, 2017 (KR) .................. 10-2017-0015362

(51) Int. Cl.
*G05B 5/00* (2006.01)
*H02P 27/08* (2006.01)
*H02P 23/00* (2016.01)

(52) U.S. Cl.
CPC ........ *H02P 27/085* (2013.01); *H02P 23/0004* (2013.01)

(58) Field of Classification Search
CPC . H02P 27/047; H02P 2205/07; H02P 21/0021
See application file for complete search history.

(56) References Cited

U.S. PATENT DOCUMENTS

2014/0210391 A1* 7/2014 Bozic ............... H02P 6/181
318/400.11

FOREIGN PATENT DOCUMENTS

| JP | H06253576 A | 9/1994 |
|---|---|---|
| JP | 2009219216 A | 9/2009 |
| JP | 5164025 B2 | 3/2013 |
| JP | 2015171302 A | 9/2015 |
| JP | 2015186346 A | 10/2015 |
| KR | 100371371 B1 | 2/2003 |

OTHER PUBLICATIONS

Choi, Seung-Cheol, et al. "Slip Frequency Compensation of Medium Voltage Inverter"; LSIS R&D Center;Jul. 6, 2016; (Supportive Material for Exception to the Loss of Novelty, English Translation Attached).
Korean Office Action for related Korean Application No. 10-2017-0015362; action dated Nov. 17, 2017; (4 pages).

* cited by examiner

*Primary Examiner* — Karen Masih
(74) *Attorney, Agent, or Firm* — K&L Gates LLP (57) ABSTRACT

An apparatus for controlling an inverter is disclosed. The apparatus for controlling the inverter contained in an inverter system configured to drive a motor determines a slip frequency to be used for compensation of a frequency of a first reference voltage, not only using a first reference voltage (including an amplitude and frequency) of the first reference voltage applied to the inverter, but also using an output current of the motor or a rotor speed of the motor. The apparatus determines not only a frequency of a second reference voltage obtained by compensation of the slip frequency, but also an amplitude of the second reference voltage corresponding to the frequency of the second reference voltage.

5 Claims, 6 Drawing Sheets

APPARATUS FOR CONTROLLING INVERTER

CROSS-REFERENCE TO RELATED APPLICATION

This application claims the benefit of Korean Patent Application No. 10-2017-0015362, filed on Feb. 3, 2017 in the Korean Intellectual Property Office, the disclosure of which is incorporated herein by reference.

BACKGROUND OF THE INVENTION

1. Field of the Invention

The present disclosure relates to an apparatus for controlling an inverter, and more particularly to an apparatus for controlling an inverter by compensating for a slip frequency of a motor in a reference frequency of an inverter.

2. Description of the Related Art

A medium-voltage inverter is an inverter having a root-mean-square (RMS) input line-to-line voltage of 600V or higher. The medium-voltage inverter may have various rated power capacities ranging from hundreds of kilowatts (kW) to dozens of megawatts (MW), and has been widely used in various application fields, for example, fans, pumps, compressors, etc.

A representative example of the medium-voltage inverter is a multi-level inverter configured to output a voltage of at least 3 levels. Specifically, a cascaded H-bridge inverter has been widely used as the medium-voltage inverter. The amplitude of each output voltage level of the cascaded H-bridge inverter and the number of output voltage levels of the cascaded H-bridge inverter may be determined according to power cells contained in the cascaded H-bridge inverter, and an insulated voltage may be input to each power cell.

In the meantime, the induction motor widely used in industrial systems can be frequency-controlled by voltage/frequency (V/F) operation, and has been widely used in various application fields such as fans, pumps, blowers, etc. not requiring rapid operation characteristics in an operation region having a rated speed or less. However, a slip frequency may occur in the induction motor according to application load in which load is changed, such that it may be impossible to operate the induction motor at a given speed. Specifically, in a technical field such as a conveyor in which a given-speed operation is requested, there is a need for the slip frequency to be properly compensated in a manner that the actual operation speed is identical to a reference speed.

Figure 1:
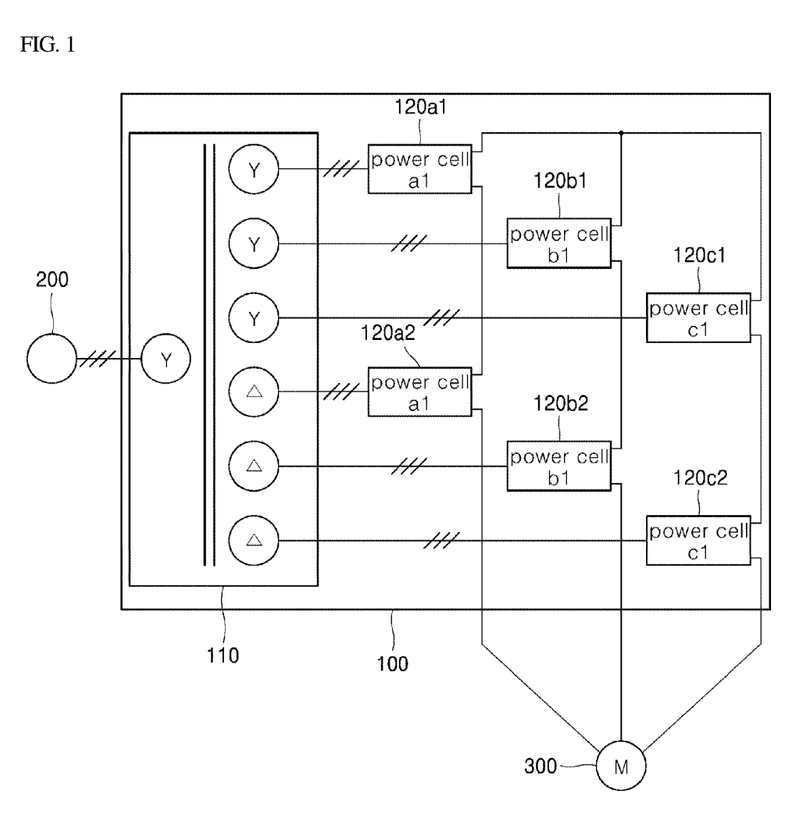
FIG. 1 is a view illustrating a conventional multi-level medium-voltage inverter system.

FIG. 1 is a view illustrating a conventional multi-level medium-voltage inverter system. FIG. 1 illustrates a cascaded H-bridge structure composed of a two-level unit power cell. The root-mean-square (RMS) line-to-line voltage of a main supply 200 may be a 3-phase voltage of 600V or higher. The output voltage of the inverter 100 may be input to a high-voltage 3-phase motor 300. The motor 300 may be an inductor motor or a synchronous motor.

A phase shift transformer 110 of the inverter 100 may insulate the main supply 200, and may change the phase and magnitude of a voltage according to a request of a unit power cell 120. In addition, total harmonic distortion (THD) of an input current of the main supply 200 may increase due to phase shifting.

The unit power cell 120 may use an output signal of the phase shift transformer 110 as an input signal, and output voltages of power cells of the respective phases are then synthesized, resulting in configuration of the output signal of the inverter 100. The a-phase output voltage of the inverter 100 may be a sum of output voltages of the unit power cells (120a1, 120a2) connected in series. Likewise, the b-phase output voltage may be a sum of unit power cells (120b1, 120b2) connected in series, and the c-phase output voltage may be a sum of unit power cells (120c1, 120c2) connected in series. In association with the output voltage of the synthesized medium-voltage inverter 100, the respective phase voltages may have a phase difference of 120 degrees therebetween whereas they have the same amplitude. In addition, with the increasing number of unit power cells 120 contained in the medium voltage inverter 100 and various switching actions, a total harmonic distortion (THD) and voltage regulation rate (dv/dt) of the output voltage applied to the motor 300 can be improved.

Figure 2:
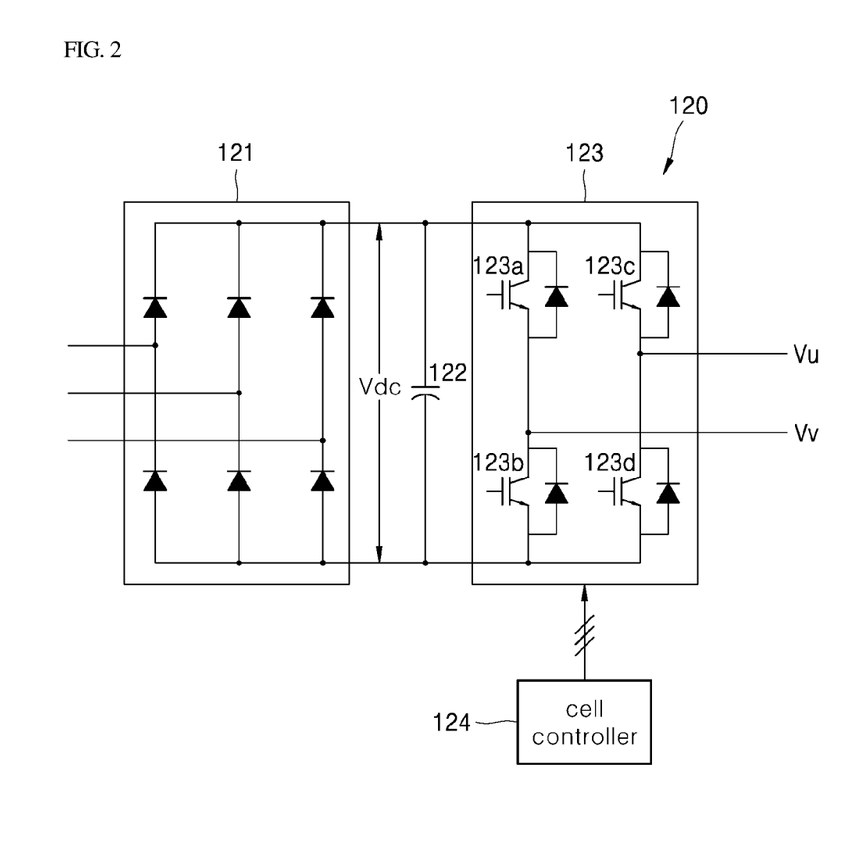
FIG. 2 is an example of the unit power cell illustrated in FIG. 1.

FIG. 2 is an example of the unit power cell illustrated in FIG. 1, and the unit power cell of FIG. 1 may be modified into various shapes.

Referring to FIG. 2, a rectifying unit 121 may convert an AC voltage received from the phase shift transformer into a DC voltage, and may include a plurality of diodes. The amplitude of the rectified DC-link voltage may be decided by the relationship of a difference between input power of the rectifying unit 121 and output power of an inverter unit 123. If the input power received from the rectifying unit 121 is higher than output power consumed by load, the DC-link voltage may increase. If the input power received from the rectifying unit 121 is equal to or lower than output power consumed by load, the DC-link voltage may decrease.

The DC-link capacitor 122 may solve instantaneous power unbalance of input/output (I/O) terminals. The inverter unit 123 may synthesize an output voltage on the basis of the DC-link voltage, and may include a plurality of power switches. The cell controller 124 may be independently allocated to each unit power cell 120, and may provide a gating signal for deciding a power switching state of the inverter unit 123.

Figure 3:
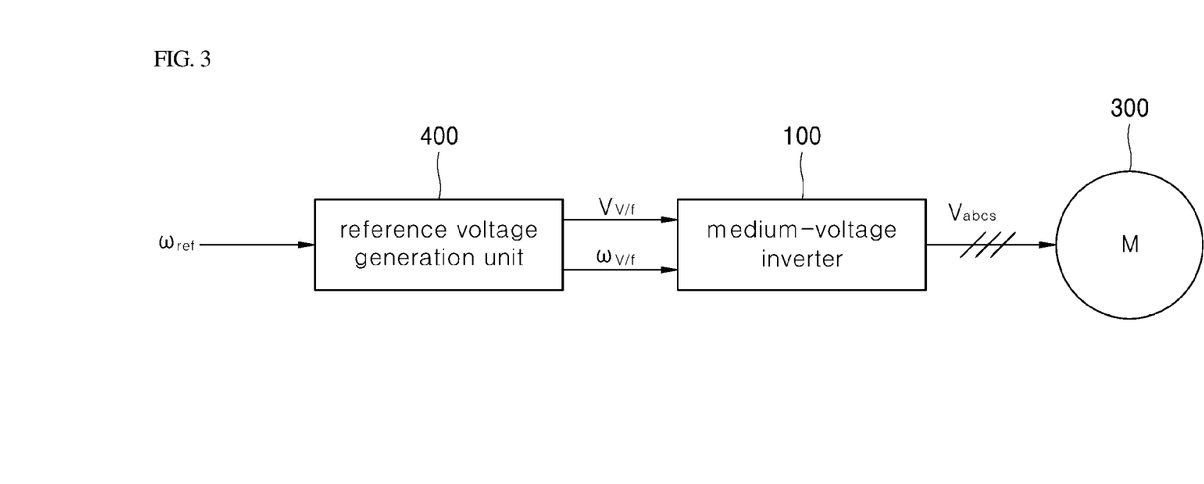
FIG. 3 is a block diagram illustrating a conventional voltage/frequency (V/F) control system.

FIG. 3 is a block diagram illustrating a conventional voltage/frequency (V/F) control system.

Referring to FIG. 3, if a user inputs a reference frequency ($\omega_{ref}$), a reference voltage generation unit may generate the magnitude ($V_{V/f}$) and frequency ($\omega_{V/f}$) of a reference voltage generated from the inverter 100 in response to the corresponding reference frequency. The inverter 100 may synthesize 3-phase pulse width modulation (PWM) voltages (Vas, Vbs, Vcs) corresponding to the reference voltage, thereby driving the motor 300.

Figure 4:
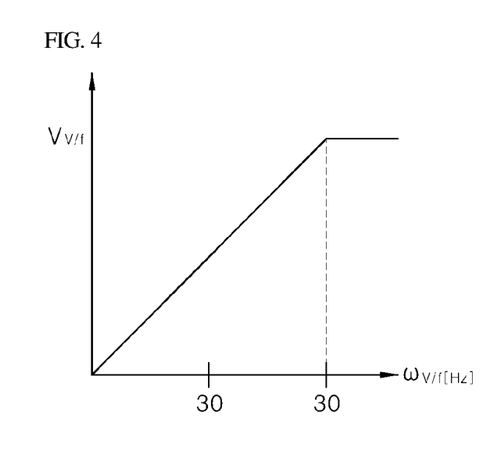
FIG. 4 is a graph illustrating the relationship between an output frequency and an output voltage of the inverter for use in the voltage/frequency (V/F) control system.

FIG. 4 is a graph illustrating the relationship between an output frequency and an output voltage of the inverter for use in the voltage/frequency (V/F) control system.

Referring to FIG. 4, since the output frequency ($\omega_{ref}$) starts from 0 Hz during initial starting, the inverter outputs a low voltage. As the frequency gradually increases, the inverter outputs a voltage having an amplitude proportional to the increasing frequency. If the output frequency reaches a target frequency, the voltage/frequency (V/F) control system does not increase the frequency any longer, and operates at a constant speed.

The voltage/frequency (V/F) control method is a motor control method widely used in various industrial fields. The voltage/frequency (V/F) control method may be advantageous in terms of speed control and ease of implementation. Generally, the voltage/frequency (V/F) control method has been widely used in industrial fields not requiring rapid operation characteristics in an operation region having a rated speed or less. However, since the slip frequency increases during a high-load operation, the motor rotates at a speed different from a user-input speed, resulting in reduction of speed accuracy. That is, the slip frequency caused by load occurs in a variable-load operation condition, resulting in occurrence of a speed error.

SUMMARY OF THE INVENTION

Accordingly, the present disclosure is directed to an apparatus for controlling an inverter that substantially obviates one or more problems due to limitations and disadvantages of the related art.

It is an object of the present disclosure to provide an apparatus for controlling an inverter which calculates a slip frequency and compensates for the calculated slip frequency, thereby driving a motor at a predetermined speed irrespective of load.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for controlling an inverter contained in an inverter system configured to drive a motor includes: a slip frequency decision unit configured to determine a first slip frequency to be used for compensation of a frequency of a first reference voltage, not only using a first reference voltage (including an amplitude and frequency) of the first reference voltage applied to the inverter, but also using an output current of the motor or a rotor speed of the motor; and a reference voltage generation unit configured to determine not only a frequency of a second reference voltage achieved by compensation of the first slip frequency, but also an amplitude of the second reference voltage corresponding to the frequency of the second reference voltage, and apply the second reference voltage to the inverter.

The slip frequency decision unit may include: a closed-loop controller configured to determine a second slip frequency using the rotor speed of the motor; and an open-loop controller configured to determine a third slip frequency, using an output current of the motor, the amplitude and frequency of the first reference voltage, and a nominal value of the motor.

The closed-loop controller may include: a comparator configured to compare the first frequency with the rotor speed of the motor; and a proportional integral (PI) controller configured to output the second slip frequency by PI-controlling an output signal of the comparator.

The open-loop controller may include: a load power decision unit configured to determine load power in consideration of the amplitude of the first reference voltage, the output current of the motor, and the number of poles of the motor; a load torque decision unit configured to determine a load torque in consideration of the load power and the frequency of the first reference voltage; and an open-loop slip frequency decision unit configured to determine the third slip frequency in consideration of the load torque, a rated torque of the motor, and a rated slip frequency of the motor.

The open-loop controller may further include: a filter configured to perform low pass filtering of an output signal of the open-loop slip frequency decision unit.

The slip frequency decision unit may further include: an adder configured to add the second slip frequency and the third slip frequency, thereby outputting the first slip frequency.

DETAILED DESCRIPTION OF THE EMBODIMENTS

Reference will now be made in detail to the embodiments of the present disclosure, examples of which are illustrated in the accompanying drawings. Wherever possible, the same reference numbers will be used throughout the drawings to refer to the same or like parts. However, the scope or spirit of the present disclosure is not limited to the embodiments and may be realized in various other forms. The embodiments are only provided to more completely illustrate the present disclosure and to enable a person having ordinary skill in the art to fully understand the scope of the present disclosure. In the drawings, sizes and shapes of elements may be exaggerated or reduced for convenience and clarity of description.

It will be understood that when a certain element is referred to as being "located on" or "contacting" another element, the element may directly contact or be connected to the other element or one or more intervening elements may also be present. In contrast, when an element is referred to as being "right above" or "directly contacting" another element, there are no intervening elements present. In addition, it will also be understood that when an element is referred to as being "between" two elements, it may be the only element between the two elements, or one or more intervening elements may also be present.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure.

A singular representation may include a plural representation unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

Unless otherwise defined, all terms used herein, including technical or scientific terms, have the same meanings as understood by those skilled in the art.

The embodiments of the present disclosure will hereinafter be described with reference to the attached drawings.

Figure 5:
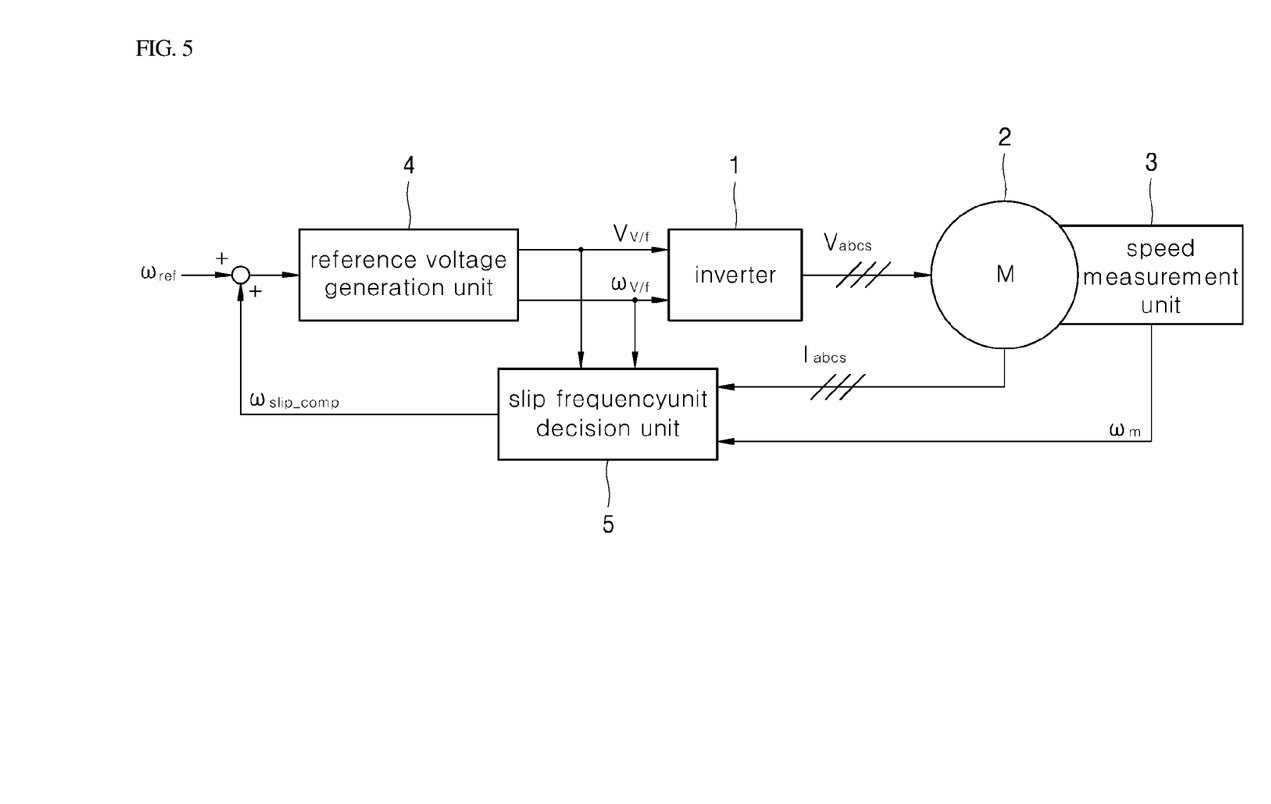
FIG. 5 is a block diagram illustrating an inverter control system according to an embodiment of the present disclosure.

FIG. 5 is a block diagram illustrating an inverter control system according to an embodiment of the present disclosure.

Referring to FIG. 5, the apparatus for controlling the inverter according to one embodiment of the present disclosure may include a reference voltage generation unit 4 and a slip frequency decision unit 5.

The reference voltage generation 4 may generate a reference voltage of the inverter 1, and the magnitude ($V_{V/f}$) and frequency ($\omega_{V/f}$) of the reference voltage of the inverter 1 may be applied to the inverter 1. The inverter 1 may drive the motor 3 by synthesizing 3-phase PWM voltages corresponding to the corresponding reference voltages. In the embodiment of the present disclosure, the inverter 1 may be a medium-voltage inverter, and the motor 3 may be an induction motor or a synchronous motor, without being limited thereto.

In this case, the reference voltage generation unit 4 may compensate for the slip frequency ($\omega_{slip\_comp}$) in the frequency ($\omega_{V/f}$) of the reference voltage, and may determine the magnitude of the corresponding reference voltage with reference to the voltage-frequency relationship shown in FIG. 4, thereby outputting the reference voltage to the inverter 1. That is, if the amplitude of the reference voltage increases through compensation of the frequency of the reference voltage by the slip frequency, the amplitude of a voltage corresponding to the corresponding frequency may also increase.

The slip frequency decision unit 4 may determine the slip frequency ($\omega_{slip\_comp}$). In this case, the slip frequency decision unit 5 may use a phase current of the motor 3 measured by a current sensor (not shown) or may use speed information of a rotor of the motor 3 measured by a speed measurement unit 3. A detailed description thereof will hereinafter be given with reference to the attached drawings.

Figure 6:
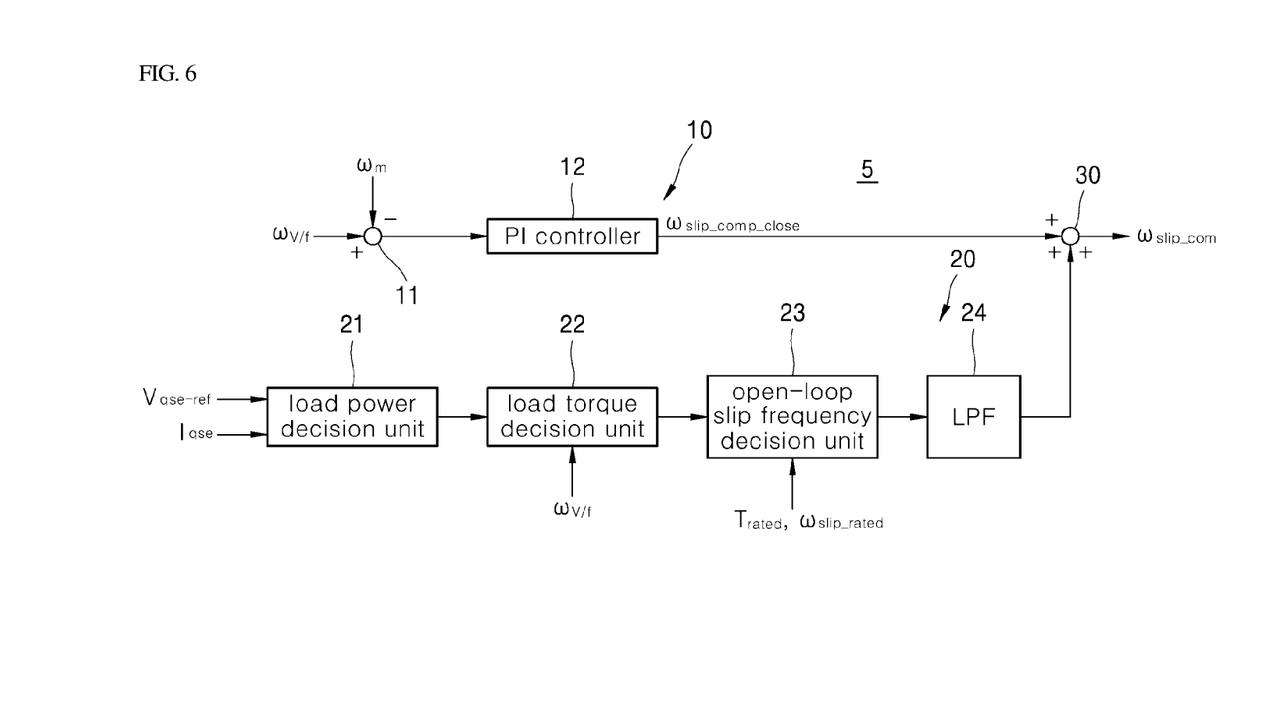
FIG. 6 is a detailed block diagram illustrating a slip frequency decision unit of FIG. 5.

FIG. 6 is a detailed block diagram illustrating a slip frequency decision unit of FIG. 5. The slip frequency decision unit of FIG. 5 may determine the slip frequency to compensate for the speed error.

Referring to FIG. 6, the slip frequency decision unit 5 according to one embodiment may include a closed-loop controller 10 and an open-loop controller 20.

The closed-loop controller 10 may include a comparator 11 and a proportional integral (PI) controller 12. The comparator 11 may compare a frequency ($\omega_{V/f}$) of the reference voltage received from the reference voltage generation unit 4 with an actual rotational speed ($\omega_m$) of the rotor of the motor 2, wherein the actual rotational speed ($\omega_m$) of the rotor of the motor 2 is received from the speed measurement unit 3.

The PI controller 12 may receive an output signal of the comparator 11, and may output a slip frequency ($\omega_{slip\_comp\_close}$) based on the closed loop through PI control.

The PI operation may be implemented by a proportional operation and an integral operation. The PI operation can perform the PI operation proportional to a deviation between a control variable and a target value, and at the same time can remove residual deviation caused by disturbance using the integral operation. A detailed description of the PI operation is well known to those skilled in the art, and as such a detailed description thereof will herein be omitted for convenience of description.

In the meantime, the closed-loop controller 20 may include a load power decision unit 21, a load torque decision unit 22, an open-loop slip frequency decision unit 23, and a low pass filter (LPF) 24.

Upon receiving not only a q-axis voltage ($V_{qse\_ref}$) of a synchronous reference frame corresponding to the amplitude of the reference voltage received from the reference voltage generation unit 4, but also an actually-measured output phase current ($I_{qse}$) of the motor 2, the load power decision unit 21 may determine load power on the basis of the received q-axis voltage ($V_{qse\_ref}$) and the output phase current ($I_{qse}$). In this case, the load power may be determined by the following equation 1.

$$P_{load} = \frac{3}{2} \times \frac{\text{Pole}}{2} \times V_{qse\_ref} \times I_{qse} \quad [\text{Equation 1}]$$

In Equation 1, "Pole" is the number of poles. The load torque decision unit 22 may determine a load torque from load power using the frequency ($\omega_{V/f}$) of the reference voltage received from the reference voltage generation unit 4. In this case, the load torque may be determined by the following equation 2.

$$T_{load} = \frac{P_{load}}{\omega_{V/f}} \quad [\text{Equation 2}]$$

In Equation 2, $\omega_{V/f}$ is a frequency of the reference voltage. The open-loop slip frequency decision unit 23 may determine the open-loop based slip frequency ($\omega_{slip\_comp\_open}$) on the basis of a load torque ($T_{load}$), a rated torque ($T_{load}$), and a rated slip frequency ($\omega_{slip\_rated}$), using the following equation 3.

$$\omega_{slip\_comp\_open} = T_{load} \cdot \frac{\omega_{slip\_rated}}{T_{rated}} \quad [\text{Equation 3}]$$

In Equation 3, the rated torque ($T_{rated}$) may be determined by the following equation 4.

$$T_{rated} = \frac{\text{Pole}}{2} \cdot \frac{P_{rated}}{\omega_{rated}} \quad [\text{Equation 4}]$$

In Equation 4, "Pole" is the number of poles, $P_{rated}$ is a rated power of the motor 2, and $\omega_{rated}$ is a rated speed of the motor 2.

That is, the open-loop slip frequency decision unit 23 may multiply load torque decided by the output current of the motor 2 by the ratio of the rated torque (calculated from a nominal value of the motor 2) to the rated slip frequency, thereby calculating the actual slip frequency. The rated slip frequency may be recognized from the nominal value of the motor 2, and the rated torque of the motor 2 may be determined on the basis of the rated power of the motor, the number of poles, and the rated speed according to Equation 4. In addition, the load torque may be determined by load power as shown in Equation 2. In order to calculate the load power, the q-axis output voltage (reference voltage) of the synchronous reference frame of the reference voltage is multiplied by the actual current (i.e., a motor current having the same phase as the reference voltage), and the number of poles is considered, such that the load power can be determined as shown in Equation 1. The load torque may be determined by dividing the load power by the reference frequency, as shown in Equation 2. Thereafter, the determined load power is multiplied by the ratio of the rated slip frequency to the rated torque, such that the slip frequency based on the open loop may be determined.

Rapid change of the slip frequency may cause a high inrush current. A low pass filter 24 may pass a low frequency component of the slip frequency received from the open-loop slip frequency decision unit 23, resulting in implementation of system stabilization.

The slip frequency of the closed-loop controller 10 and the slip frequency of the open-loop controller 20 may be added by an adder 30, such that the adder 30 may output the last slip frequency.

The slip frequency decision unit 5 may be implemented by parallel connection between closed-loop control and open-loop control. The open-loop based slip frequency generated from the open-loop controller 20 may operate by feed forward of the closed-loop controller 10.

The relative amplitude of the slip frequency decided by the closed-loop controller 10 and the open-loop controller 20 may be changed according to accuracy of the nominal value. As the accuracy of the nominal value, the slip frequency of the open-loop controller 20 configured to operate in a feed forward manner is higher than the slip frequency of the closed-loop controller 10. In other words, the role of the closed-loop controller 10 may be relatively reduced.

On the other hand, if the nominal value of the motor 2 has low accuracy, the error of the slip frequency of the open-loop controller 20 may increase, and the speed error may be reduced by the closed-loop controller 10.

As described above, the slip frequency calculated by the slip frequency decision unit 5 may be compensated by the frequency of the reference voltage, such that the operation frequency of the inverter 1 may increase. As a result, the operation speed of the actual motor 2 may rotate at the same speed as the reference speed entered by the user. The embodiment of the present disclosure can properly calculate the slip frequency needed for compensation even under variable load, such that the motor 2 can maintain a constant rotational speed.

That is, the apparatus for controlling the inverter according to one embodiment may compensate for the slip frequency in the frequency of the reference voltage, and may output the resultant slip frequency to the inverter. The slip frequency according to one embodiment may be implemented by a hybrid control method implemented by parallel connection between the open-loop control and the closed-loop control, such that the slip frequency can employ merits of the above-mentioned two control schemes while eliminating drawbacks of the two control schemes.

Current measurement sampling is faster than speed measurement sampling, such that a relatively rapid response can be expected as feed forward. In contrast, the slip frequency error of the open loop control caused by low accuracy of the nominal value of the motor can be supplemented by closed-loop control. As described above, merits and drawbacks of the above-mentioned two control schemes are complementary to each other, such that the slip frequency can be rapidly and correctly compensated.

Therefore, the apparatus for controlling the inverter according to the embodiment can compensate for the slip frequency even in a large-load operation condition, such that the apparatus can control the system in a manner that the motor rotates at the same speed as the user-input speed. As a result, the apparatus according to the present disclosure can prevent occurrence of a speed error in a variable-load operation condition when the slip frequency caused by load occurs in the variable-load operation condition, resulting in increased speed accuracy.

As is apparent from the above description, the apparatus for controlling the inverter according to the embodiments of the present disclosure can allow the motor to maintain a constant rotational speed because the slip frequency for compensation is properly calculated even in a variable load condition.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. An apparatus for controlling an inverter contained in an inverter system configured to drive a motor, comprising:
   a slip frequency decision unit configured to determine a first slip frequency to be used for compensation of a frequency of a first reference voltage, not only using a first reference voltage (including an amplitude and frequency) of the first reference voltage applied to the inverter, but also using an output current of the motor or a rotor speed of the motor; and
   a reference voltage generation unit configured to determine not only a frequency of a second reference voltage achieved by compensation of the first slip frequency, but also an amplitude of the second reference voltage corresponding to the frequency of the second reference voltage, and apply the second reference voltage to the inverter,
   wherein the slip frequency decision unit includes:
   a closed-loop controller configured to determine a second slip frequency using the rotor speed of the motor; and
   an open-loop controller configured to determine a third slip frequency, using an output current of the motor, the amplitude and frequency of the first reference voltage, and a nominal value of the motor.

2. The apparatus according to claim 1, wherein the closed-loop controller includes:
   a comparator configured to compare the first frequency with the rotor speed of the motor; and
   a proportional integral (PI) controller configured to output the second slip frequency by PI-controlling an output signal of the comparator.

3. The apparatus according to claim 1, wherein the open-loop controller includes:
   a load power decision unit configured to determine load power in consideration of the amplitude of the first reference voltage, the output current of the motor, and the number of poles of the motor;
   a load torque decision unit configured to determine a load torque in consideration of the load power and the frequency of the first reference voltage; and
   an open-loop slip frequency decision unit configured to determine the third slip frequency in consideration of the load torque, a rated torque of the motor, and a rated slip frequency of the motor.

4. The apparatus according to claim 3, wherein the open-loop controller further includes:
   a filter configured to perform low pass filtering of an output signal of the open-loop slip frequency decision unit.

5. The apparatus according to claim 1, wherein the slip frequency decision unit further includes:
an adder configured to add the second slip frequency and the third slip frequency, thereby outputting the first slip frequency.

\* \* \* \* \*